United States Patent
Ballew

(10) Patent No.: US 8,160,061 B2
(45) Date of Patent: Apr. 17, 2012

(54) REDUNDANT NETWORK SHARED SWITCH

(75) Inventor: James D. Ballew, Grapevine, TX (US)

(73) Assignee: Raytheon Company, Waltham, MA (US)

( * ) Notice: Subject to any disclaimer, the term of this patent is extended or adjusted under 35 U.S.C. 154(b) by 686 days.

(21) Appl. No.: 11/618,196

(22) Filed: Dec. 29, 2006

(65) Prior Publication Data

US 2008/0162732 A1 Jul. 3, 2008

(51) Int. Cl.
*H04L 12/50* (2006.01)
(52) U.S. Cl. .......................................... 370/386; 398/19
(58) Field of Classification Search .................. 370/386; 398/19
See application file for complete search history.

(56) References Cited

U.S. PATENT DOCUMENTS

| | | | |
|---|---|---|---|
| 5,495,474 A * | 2/1996 | Olnowich et al. | 370/359 |
| 5,521,591 A | 5/1996 | Arora et al. | 340/826 |
| 5,588,152 A | 12/1996 | Dapp et al. | |
| 5,729,752 A | 3/1998 | Snider et al. | 395/800 |
| 6,468,112 B1 | 10/2002 | Follingstad et al. | |
| 6,571,030 B1 | 5/2003 | Ramaswami et al. | |
| 6,646,984 B1 * | 11/2003 | Mehra et al. | 370/220 |
| 7,042,878 B2 * | 5/2006 | Li | 370/392 |
| 7,483,374 B2 * | 1/2009 | Nilakantan et al. | 370/235 |
| 2006/0013207 A1 * | 1/2006 | McMillen et al. | 370/388 |
| 2006/0106931 A1 | 5/2006 | Richoux | |
| 2006/0182440 A1 * | 8/2006 | Stefanov et al. | 398/19 |
| 2008/0101395 A1 | 5/2008 | Ballew | |

FOREIGN PATENT DOCUMENTS

EP 1 737 253 A1 6/2005

OTHER PUBLICATIONS

*Notification of Transmittal of the International Search Report and the Written Opinion of the International Searching Authority, or the Declaration* for International Application No. PCT/US2007/087947; 11 pages.
Applicant: James D. Ballew; U.S. Appl. No. 11/554,512; Entitled: System and Method for Networking Computer Clusters.
*Notification of Transmittal of the International Search Report and the Written Opinion of the International Searching Authority, or the Declaration* for International Application No. PCT/US2007/081722; 13 pages, May 30, 2008.
"MS-8X; 8-Port Modular SCL Switch; For clustering, SANs, networking and bus bridging," Dolphin Interconnect Solutions, XP-002480478, 2 pages, Jan. 2002.
Harbaugh, "Building High-Performance Linux Clusters, Sponsored by Appro," XP-002480128, 23 pages, Jun. 2004.
"Installation Guide for Dolphin PCI-SCI Adapters," Dolphin Interconnect Solutions, XP-002480479, 20 pages, Sep. 6, 2006.
EPO, Communication Pursuant to Article 94(3)EPC, Mailed Dec. 16, 2010, Application No. 07 865 807.7-1249, 7 pages.

* cited by examiner

*Primary Examiner* — Robert Wilson
*Assistant Examiner* — Wei Zhao
(74) *Attorney, Agent, or Firm* — Cantor Colburn LLP

(57) ABSTRACT

In one embodiment, a computer cluster network includes at least three switches communicatively coupled to respective at least one client nodes. At least one of the at least three switches communicatively couples together at least two other ones of the plurality of switches. In a method embodiment, a method of networking client nodes includes communicatively coupling each switch of at least three switches to respective at least one client nodes. The method also includes communicatively coupling together at least two switches of the at least three switches through at least one other switch of the at least three switches.

11 Claims, 4 Drawing Sheets

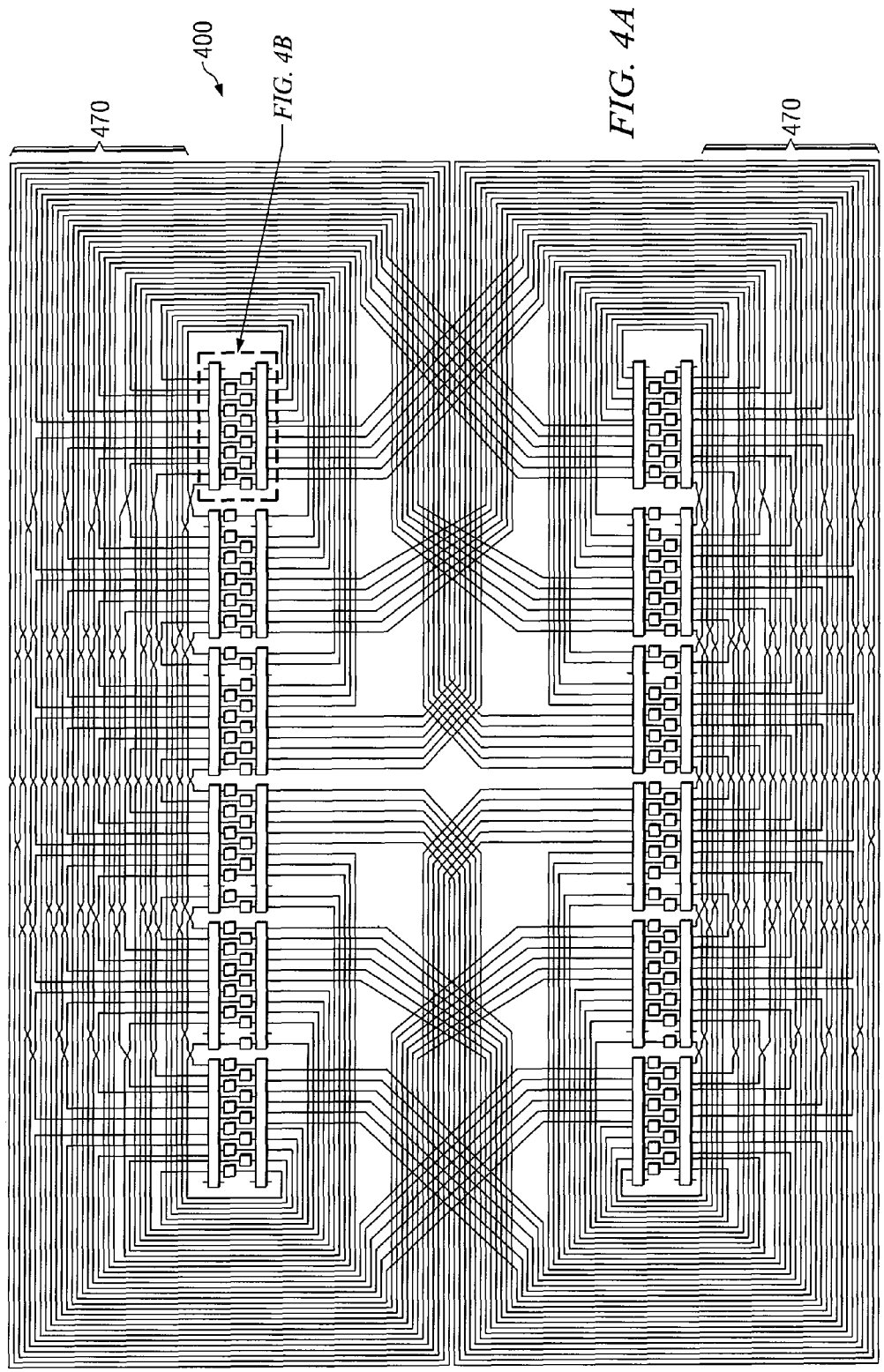

REDUNDANT NETWORK SHARED SWITCH

TECHNICAL FIELD

This invention relates to computer systems and, in particular, to computer network clusters having an increased bandwidth.

BACKGROUND

Computer cluster networks constructed with a fat-tree topology are very often used to interconnect the client nodes in massively parallel computer systems. This type of topology is often called a "tree" because of its structure with a trunk, branches, and leafs that ultimately connect to client nodes. In addition, fat-tree networks typically provide communication between client nodes at a constant bandwidth, because the number of connections out of each switch level to the next higher level is the same as the number of connections from the previous lower level. The lowest level includes the "leaves" with ports that connect to the client nodes. High performance computers are being used more and more for essential functions that require higher bandwidth, reliability, and for applications using very large numbers of processors requiring higher availability. To meet these needs, conventional network clusters typically include duplicate fat-tree networks stemming off the client nodes, or dual-rail network configurations. However, the cost of this improved capability is typically double that of a single-rail network.

SUMMARY OF THE EXAMPLE EMBODIMENTS

In one embodiment, a computer cluster network includes at least three switches communicatively coupled to respective at least one client nodes. At least one of the at least three switches communicatively couples together at least two other ones of the plurality of switches.

In a method embodiment, a method of networking client nodes includes communicatively coupling each switch of at least three switches to respective at least one client nodes. The method also includes communicatively coupling together at least two switches of the at least three switches through at least one other switch of the at least three switches.

Technical advantages of some embodiments of the invention may include an increased bandwidth and redundancy over that provided by conventional single-rail fat-tree networks at a much lower cost than can be realized with conventional dual-rail networks. In addition, various embodiments may be able to use conventional software developed to manage fat-tree networks.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and features and advantages thereof, reference is now made to the following description, taken in conjunction with the accompanying drawings, in which:

FIG. 4A is a block diagram illustrating an example embodiment of a portion of the computer cluster network of FIG. 1 having fully redundant communication paths communicatively coupling each of one-hundred and thirty-two client nodes.

DESCRIPTION OF EXAMPLE EMBODIMENTS

In accordance with the teachings of the present invention, a network cluster having an improved network fabric and a method for the same are provided. By utilizing a particular network fabric configuration, particular embodiments are able to realize an increased bandwidth and redundancy at reduced costs. Embodiments of the present invention and its advantages are best understood by referring to FIGS. 1 through 4 of the drawings, like numerals being used for like and corresponding parts of the various drawings. Particular examples specified throughout this document are intended for example purposes only, and are not intended to limit the scope of the present disclosure. Moreover, the illustrations in FIGS. 1 through 4 are not necessarily drawn to scale.

Figure 1:
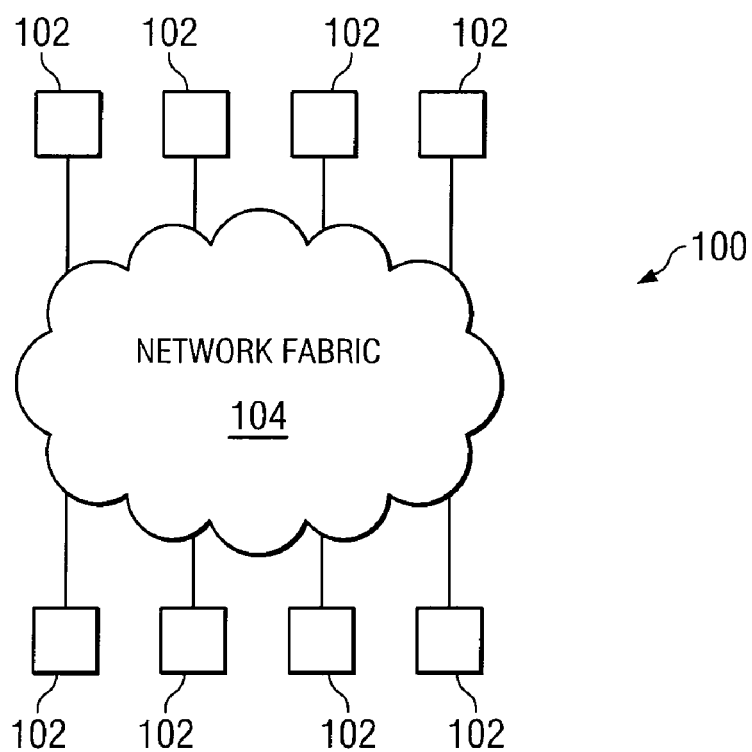
FIG. 1 is a block diagram illustrating an example embodiment of a portion of a computer cluster network according to the teachings of the invention.

FIG. 1 is a block diagram illustrating an example embodiment of a portion of a computer cluster network 100. Computer cluster network 100 generally includes a plurality of client nodes 102 interconnected by a network fabric 104. As will be shown, the network fabric 104 in some embodiments of the present invention may or may not provide redundant communication paths between each of the client nodes 102.

Client nodes 102 generally refer to any suitable device or devices operable to communicate with each other through network fabric 104, including one or more of the following: switches, processing elements, memory elements, or input-output elements. In the example embodiment, client nodes 102 include computer processors. Network fabric 104 generally refers to any interconnecting system capable of transmitting audio, video, signals, data, messages, or any combination of the preceding. In this particular embodiment, network fabric 104 comprises a plurality of switches interconnected by copper cables.

Conventional network fabrics generally include dedicated edge switches and dedicated core switches. The edge switches couple the core switches to client nodes, while the core switches couple other core switches and/or edge switches together. For example, a message from a client node may route through the respective edge switch, then through a core switch, and then to a destination edge switch connected to the destination client node. Core switches by definition are not directly coupled to client nodes. For purposes of this disclosure and in the following claims, the term "directly coupled" means communicatively networked together without any intervening switches or client nodes, while the term "coupled" means communicatively networked together with or without any intervening switches or client nodes. Conventionally, systems that require higher bandwidth and redundancy often include duplicate fat-tree networks stemming off the client nodes, or dual-rail network configurations. However, the cost of this improved capability is often double that of a single-rail network, at least partially due to the utilization of twice the number of switches. Accordingly, teachings of some of the embodiments of the present invention recognize ways to increase bandwidth and redundancy over that provided by conventional single-rail fat-tree networks at a much lower cost than can be realized with conventional dual-rail networks. As will be shown, in various embodiments, the enhanced bandwidth, redundancy, and cost-efficiency may be effected by reducing the total number of switches over conventional architectures and increasing switch functionality relative to conventional routing schemes. Example embodiments of such improved network clusters are illustrated in FIGS. 2 through 4.

Figure 2:
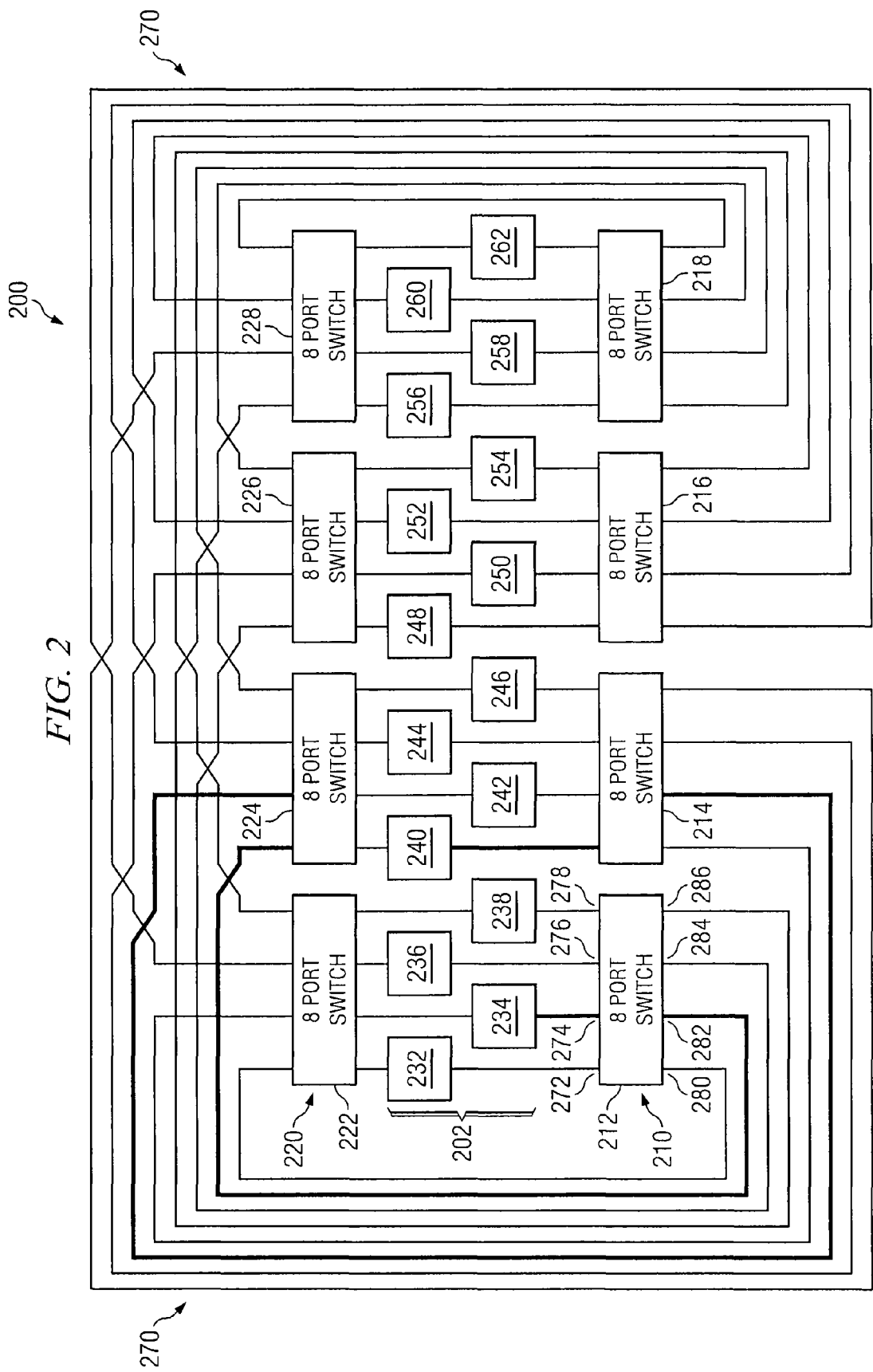
FIG. 2 is a block diagram illustrating an example embodiment of a portion of the computer cluster network of FIG. 1 having a majority of sixteen client nodes communicatively coupled together by redundant communication paths.
Figure 3:
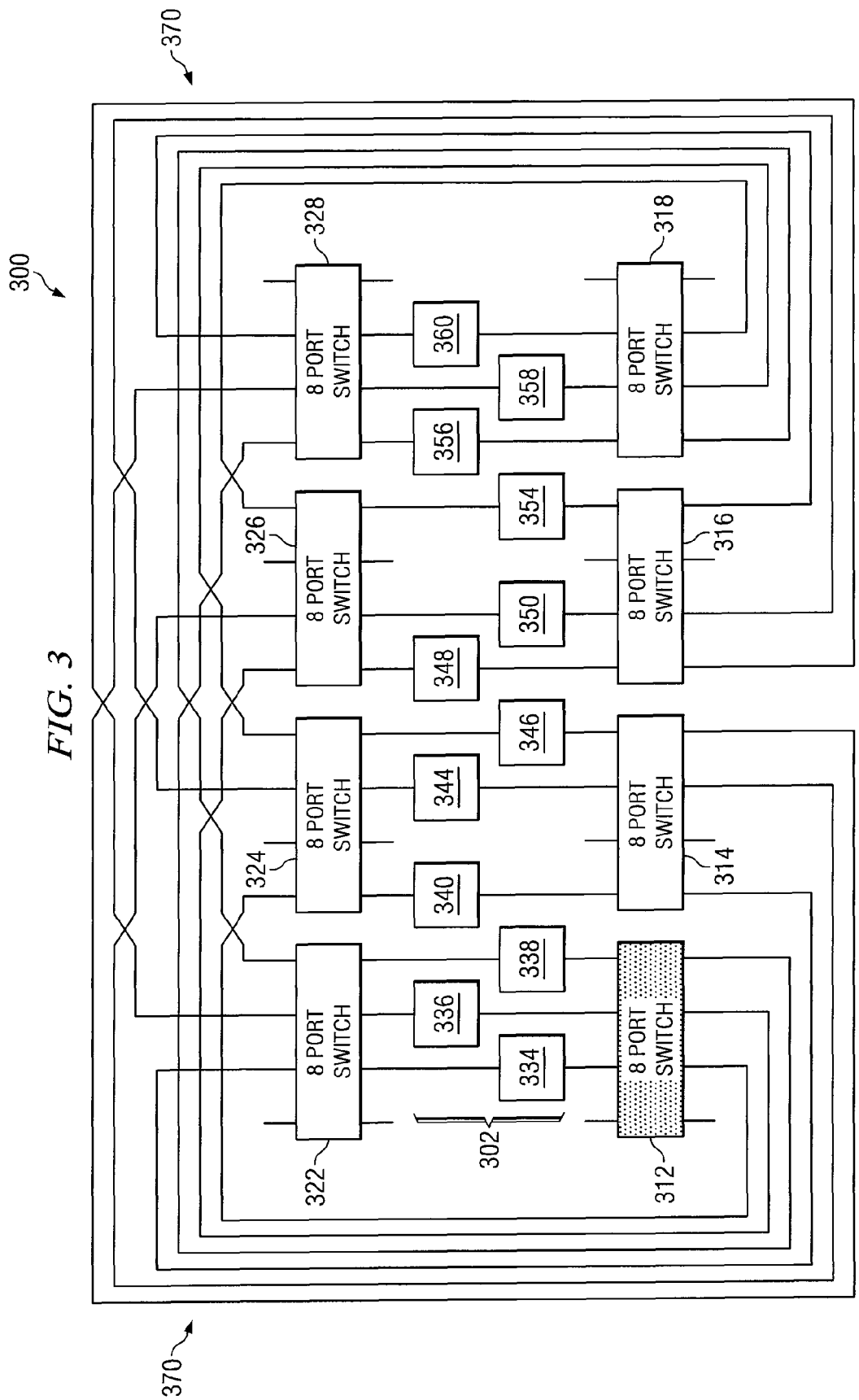
FIG. 3 is a block diagram illustrating an example embodiment of a portion of the computer cluster network of FIG. 1 having fully redundant communication paths communicatively coupling each of twelve client nodes.

FIG. 2 is a block diagram illustrating an example embodiment of a portion of the computer cluster network having a majority of sixteen client nodes communicatively coupled together by redundant communication paths. In various embodiments, computing cluster network 200 may form at least a portion of the computing cluster network 100 of FIG. 1. Computer cluster network 200 generally includes a plurality of connectors 270 coupling a plurality of switches 212, 214, 216, 218, 222, 224, 226, and 228, and generally provides communication paths that interconnect client nodes 102. In the example embodiment, each client node 232, 234, 236, 238, 240, 252, 244, 246, 248, 250, 252, 254, 256, 258, 260, and 262 couples to at least two sets of switches 210 and 220, with each switch set 210 and 220 forming a portion of a virtual network. As will be shown, the two virtual networks may be used to provide redundant communication paths communicatively coupling together the client nodes 202 of massively parallel computer systems.

Connectors 270 generally refer to any interconnecting medium capable of transmitting audio, video, signals, data, messages, or any combination of the preceding. Connectors 270 generally couple switches 212, 214, 216, 218, 222, 224, 226, and 228 and client nodes 232, 234, 236, 238, 240, 252, 244, 246, 248, 250, 252, 254, 256, 258, 260, and 262 of computer cluster network 100 together. In the example embodiment, connectors 270 comprise copper cables. However, any suitable connectors 270 may be used, including, for example, fiber optic cables or metallic traces on a circuit board.

Figure 4B:
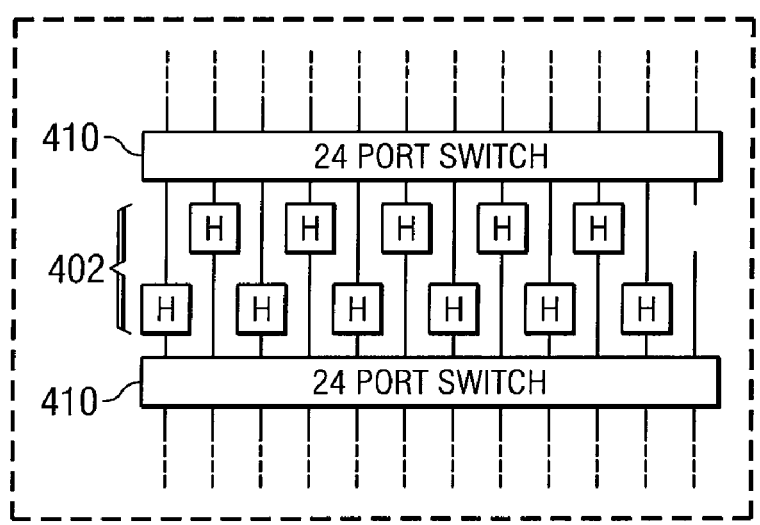
FIG. 4B is a block diagram illustrating a portion of the computer cluster network of the computer cluster network of FIG. 4A.

In the example embodiment, each switch 212, 214, 216, 218, 222, 224, 226, and 228 includes a plurality of ports (e.g., ports 272, 274, 276, 278, 280, 282, 284, and 286 of switch 212) and an integrated circuit that allows data coming into any port to exit any other port. At least one port of each switch 212, 214, 216, 218, 222, 224, 226, and 228 couples the switch 212, 214, 216, 218, 222, 224, 226, and 228 to a respective client node (e.g., port 272 couples switch 212 to client node 232). At least one other port of each switch couples the switch to another switch (e.g., port 280 couples switch 212 to switch 223). Although the switches 212, 214, 216, 218, 222, 224, 226, and 228 in this example each have eight ports (e.g., ports 272, 274, 276, 278, 280, 282, 284, and 286 of switch 212) any appropriate number of ports may be used without departing from the scope of the present disclosure. For example, network fabric 104 may include switches having twenty-four ports, as illustrated in FIGS. 4A and 4B, or may include switches having differing numbers of respective ports.

Client nodes 202 are substantially similar in structure and function to client nodes 102 of FIG. 1. In this particular embodiment, each client node 202 is capable of communicating a message to other client nodes coupled to the same switch 212, 214, 216, 218, 222, 224, 226, and 228. For example, a message from client node 232 can route to any of the client nodes 234, 236, and 238 through switch 212, without having the message route through the other switches 214, 216, 218, 222, 224, 226, and 228. However, at least a portion of the communication paths coupling together the client nodes 202 route through multiples of the switches 212, 214, 216, 218, 222, 224, 226, and 228.

To effect the routing of communication paths between switches 212, 214, 216, 218, 222, 224, 226, and 228, the example embodiment uses static routing tables, meaning a message communicated between two client nodes 202 that are not directly coupled to the same switch 212, 214, 216, 218, 222, 224, 226, or 228 includes at least one predetermined communication path. In the example embodiment, each predetermined communication path includes respective origin and destination switches 212, 214, 216, 218, 222, 224, 226, or 228 of one of the switch sets 210 or 220, and a middle switch 212, 214, 216, 218, 222, 224, 226, or 228 of the other switch set 210 or 220. For purposes of this disclosure and in the following claims, "origin switch" refers to the switch directly coupled to the client node communicating a particular message, "destination switch" refers to the switch directly coupled to the client node receiving a particular message, and "middle switch" refers to the switch communicatively coupling together the origin and destination switches. For example, as illustrated by the bolded connectors 270 of FIG. 2, a message communicated from client node 240 to client node 232 may route through origin switch 214, then through middle switch 224, then through destination switch 212, which is directly coupled to client node 232. For simplicity, the connectors 270 and static routing tables of the example embodiment are arranged in FIG. 2 such that each origin switch of switch set 210 is positioned directly opposite its respective middle switch of switch set 220 and visa versa, while the particular destination switch varies depending upon the message destination. Although this example embodiment uses static routing tables, various other embodiments may alternatively use other routing schemes. For example, other embodiments may use dynamic routing tables.

In this particular embodiment, at least a majority of the client nodes 202 are interconnected by redundant communication paths. Providing redundant communication paths may be effected by merging two virtual networks, as shown in FIG. 2. Although the two virtual networks share common connectors 270, they may function independently. To illustrate, in addition to the communication path illustrated above, a message communicated from client node 240 to client node 232 may also route through origin switch 224, then through middle switch 214, then through destination switch 220, which directly couples to client node 240. Thus, in the example embodiment, each switch may function as an origin switch, a middle switch, or a destination switch, depending on the particular communication path. The redundancy of network fabric 104 may increase the bandwidth available to the communication paths of computing system 200. In addition, various embodiments may be able to use conventional software developed to manage fat-tree networks.

Because each switch 212, 214, 216, 218, 222, 224, 226, or 228 may function as an origin, middle, or destination switch, depending on the communication path, the example embodiment reduces the total number of switches compared to conventional dual-rail fat-tree networks, at least in part, by eliminating conventional dedicated core switches. In various embodiments, the reduction in the number of switches 212, 214, 216, 218, 222, 224, 226, or 228 may enhance reliability and cost efficiency of computer cluster network 200. Various other embodiments may advantageously use the teachings of the present disclosure in conjunction with core switches. For example, core switches may couple together multiple subarrays each having merged virtual networks similar to that illustrated in FIG. 2.

The example configuration of FIG. 2 enables continued communication paths between at least a majority of the client nodes 202, even if one of the virtual networks fails. However, if one of the switches 212, 214, 216, 218, 222, 224, 226, or 228 fails, connectivity to a respective one of the client nodes 202 fails on both ports in this example configuration. For example, if switch 212 completely fails, client node 232 must communicate through switch 222, in the example embodiment. However, switch 222 uses switch 212 as a middle switch to route to switches 224, 226, and 228 in this particular embodiment. Thus, client node 232 is temporarily isolated when switch 212 fails. After a short delay, the routing management software may reconfigure network fabric 104 to reroute the message from switch 222 to another middle switch (e.g., 214, 216, or 218), but the running program may terminate during the delay. An example solution to this problem is illustrated in FIG. 3.

FIG. 3 is a block diagram illustrating an example embodiment of a portion of a computer cluster network 300 having fully redundant communication paths communicatively coupling each of twelve client nodes. That is, in this particular embodiment, the network fabric of computer system 300 generally couples together each of the client nodes 334, 336, 338, 340, 344, 346, 348, 350, 354, 356, 358, 360 with at least two different communication paths. In various embodiments, computer cluster network 300 may form at least a portion of the computer cluster network 100 of FIG. 1. Computer system 300 generally includes a plurality of connectors 370 coupling together a plurality of switches 312, 314, 316, 318, 322, 324, 326, and 328, and a plurality of client nodes 302. The switches 312, 314, 316, 318, 322, 324, 326, and 328, connectors 370, and client nodes 302 are substantially similar in structure and function to switches 212, 214, 216, 218, 222, 224, 226, or 228, connectors 270, and client nodes 202 of FIG. 2 respectively.

The network fabric 104 configuration illustrated in FIG. 3 enables each client node 334, 336, 338, 340, 344, 346, 348, 350, 354, 356, 358, 360 to maintain communication with each other client node 334, 336, 338, 340, 344, 346, 348, 350, 354, 356, 358, 360, even if one of the switches 312, 314, 316, 318, 322, 324, 326, and 328 fails. Unlike the example embodiment of FIG. 2, none of the communication paths of this particular embodiment relies on a direct coupling between a switch and a respective middle switch. One advantage of this particular configuration is that each client node 334, 336, 338, 340, 344, 346, 348, 350, 354, 356, 358, 360 has a redundant communication path to each other client node 334, 336, 338, 340, 344, 346, 348, 350, 354, 356, 358, 360. Thus, if switch 312 fails, client nodes 334, 336, and 338 may continue to communicate with any other client node 340, 344, 346, 348, 350, 354, 356, 358, 360 of computer system 300.

Although the example embodiments of FIGS. 2 and 3 use eight eight-port switches and a limited number of client nodes for simplicity, the principles of the present disclosure may be applied to significantly more complex computer systems. An example embodiment of a more complex computer system is illustrated in FIGS. 4A and 4B.

FIG. 4A is a block diagram illustrating an example embodiment of a portion of a computer cluster network 400 having fully redundant communication paths communicatively coupling each of 132 client nodes. In various embodiments, computer cluster network 400 may form at least a portion of the computer cluster network 100 of FIG. 1. As with computer system 300 of FIG. 3, the redundancy of computer cluster network 400 allows continued functionality while a network switch or connector undergoes repair or replacement. In this particular embodiment, the network fabric of computer cluster network 400 generally includes a plurality of connectors 470 coupling a plurality of switches 410 and client nodes 402, a portion of which is illustrated in FIG. 4B. The connectors 470 and client nodes 402 are substantially similar in structure and function to connectors 270 and client nodes 202 of FIG. 2 respectively. As shown in FIG. 4B, switches 410 each include twenty-four ports, as is typical for most current technology integrated circuit switches.

Various embodiments using switches with at least twenty-four ports may make fully redundant networks a more viable solution. To illustrate, the example embodiment of FIG. 3 has a 25% reduction in the number of client nodes or connectivity over the example embodiment of FIG. 2. However, the relative connectivity reduction is only 8% for configurations using twenty-four port switches as illustrated in FIGS. 4A and 4B.

The network configuration of computer cluster network 400 provides several advantages over conventionally configured single-rail or dual-rail networks. To illustrate, configuring 144 client nodes in a conventional single-rail network typically requires eighteen 24-port switches and 288 cables, with some of the switches functioning as core switches. This may be expressed mathematically as $S*P=3N$, where S is the number of switches, P is the number of ports per switch, and N is the number of client nodes. Likewise, the number of connectors typically utilized by conventional single-rail networks may be mathematically expressed as $(S*P)-N$. For conventional dual-rail networks, the mathematical expression typically is $S*P=6N$, while the number of connectors typically is $(S*P)-2N$. Although conventional dual-rail networks typically have twice the bandwidth over relative single-rail networks, dual-rail networks typically comprise twice the number of relative switches and hence double the cost, as shown by the above equations. Accordingly, teachings of some embodiments of the present invention recognize a 1.2× to a 1.5× increase in bandwidth over conventional single-rail networks, while generally reducing the number of switches and connectors by over 30% relative to conventional dual-rail fat-tree networks. Thus, in various embodiments, the proportional increase in bandwidth may be greater than the proportional increase in cost over relative single-rail networks. For example, computer cluster network 400 redundantly networks 132 client nodes 402 using only twenty-four 24-port switches 410 and 396 connectors 470. The network configuration of this particular embodiment may be expressed mathematically as $(S*P)=4(N-S)$, with the number of connectors expressed as $[S*(P-2)]-N$.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A computer cluster network comprising:
   a first switch communicatively coupled to at least a first client node;
   a second switch communicatively coupled to at least a second client node;
   a third switch communicatively coupled to at least a third client node, wherein the third switch communicatively couples together the first switch and the second switch;

a first communication path comprising the first, second, and third switches, the first communication path communicatively coupling one of the one or more first client nodes to one of the one or more third client nodes; and a second communication path comprising the first switch, the second communication path communicatively coupling one of the one or more first client nodes to one of the one or more third client nodes;

wherein each of the first switch, the second switch, and the third switch comprises a plurality of switch ports, wherein the plurality of switch ports for the first switch, the second switch, and the third switch comprises a total number of switch ports for the first switch, the second switch, and the third switch, and wherein the total number of switch ports is less than four times the total number of:

the at least the first client node;
the at least the second client node; and
the at least the third client node.

2. The computer cluster network of claim 1, wherein the first and second communication paths comprise substantially equal maximum bandwidths.

3. A method of networking a computer system, said method comprising:

communicatively coupling each switch of at least three switches to respective at least one client nodes;

communicatively coupling together at least two switches of the at least three switches using at least one other switch of the at least three switches; providing each of the at least three switches with a plurality of switch ports, wherein the plurality of switch ports of the at least three switches comprises a total number of switch ports less than or equal to four times a total number of the respective at least one client nodes;

communicatively coupling together each client node of the respective at least one client nodes with each other client node of the respective at least one client nodes through respective at least two communication paths; and providing each of the respective at least two communication paths with substantially equal maximum bandwidth capacities.

4. A computer network cluster comprising:

a first set of switches coupled to each other switch of a second set of switches, the first and second set of switches communicatively coupling each client node of a plurality of client nodes to each other client node of the plurality of client nodes over a plurality of communication paths, each of the plurality of communication paths comprising:

a first communication path comprising an origin switch of the first set of switches, a middle switch of the second set of switches, and a destination switch of the first set of switches, the first communication path communicatively coupling together a respective two of the plurality of client nodes such that a signal is routed from the origin switch of the first set of switches to the middle switch of the second set of switches, and from the middle switch of the second set of switches to the destination switch of the first set of switches; and a second communication path comprising an origin switch of the second set of switches, a middle switch of the first set of switches, and a destination switch of the second set of switches, the second communication path communicatively coupling together the respective two of the plurality of client nodes such that a signal is routed from the origin switch of the second set of switches to the middle switch of the first set of switches, and from the middle switch of the first set of switches to the destination switch of the second set of switches.

5. The computer network cluster of claim 4, wherein the second communication path is different from the first communication path.

6. The computer network cluster of claim 4, wherein the origin switch of the first set of switches and the middle switch of the first set of switches is one physical switch unit.

7. The computer cluster network of claim 4, wherein at least one of the plurality of communication paths comprises a third communication path, the third communication path comprising:

the origin switch of the first set of switches; and
a middle switch of the second set of switches, the middle switch of the third communication path being different from the middle switch of the first communication path.

8. The computer cluster network of claim 4, wherein the first and second communication paths operate independent of each other.

9. The computer cluster network of claim 4, wherein the first and second communication paths have substantially equal maximum bandwidths.

10. The computer cluster network of claim 4, wherein the first and second communication paths have substantially equal maximum bandwidths; and wherein the substantially equal maximum bandwidths are between 1.2 and 1.5 times greater than that provided by a single-rail computer cluster network constructed of substantially similar switches.

11. The computer cluster network of claim 4, wherein the first and second communication paths each have maximum bandwidths at least 1.2 times greater than that provided by a single-rail computer cluster network constructed of substantially similar switches.

* * * * *